3,310,566
SUBSTITUTED 4-PIPERIDINO-BUTYROPHENONE OXIMES

Meier E. Freed, Philadelphia, Pa., and Leonard M. Rice, Minneapolis, Minn., assignors to American Home Products Corporation, New York, N.Y., a corporation of Delaware
No Drawing. Filed Nov. 18, 1963, Ser. No. 324,230
4 Claims. (Cl. 260—293)

The invention herein disclosed relates to oximes of substituted benzoylalkyl amines and to a process for making such compounds.

The compounds of this invention can be represented by the following general formula:

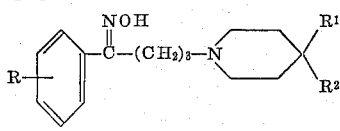

wherein R is halogen, lower alkoxy or lower alkyl; $R^1$ and $R^2$ are hydrogens, or lower alkyl groups having a total of about 5 carbons, which groups can be concatenated to form a second ring having from 5 to 6 members. A preferred group of compounds according to this invention comprises compounds where R is a fluorine atom and $R^1$ is concatenated with $R^2$.

The claimed compounds exert qualitatively varying therapeutic effects in experimental animals as evidenced by pharmacological evaluation according to standard test procedures. In particular, the novel compounds of this invention show central nervous system depressant activity, anti-metrazol, and antitremorine activities.

The claimed compounds are white crystalline solids, are substantially insoluble in cold water, and, are generally soluble in polar solvents, such as lower aliphatic alcohols. These compounds are weakly basic in nature and form pharmaceutically acceptable salts with various acids such as hydrochloric acid and nitric acid.

The process used in preparing the compounds of the invention varies slightly with the type of starting material. Starting materials having a piperidino member on the terminal carbon atom of the alkylene group, preferably N-3-aroylpropylpiperidines are refluxed with an aqueous solution of hydroxylamine hydrochloride. After refluxing for from 2 to 4 hours, the reaction mass is cooled to room temperature and made strongly alkaline to precipitate the product.

Where the starting material has has an azaspiro member attached on the terminal carbon atom of the alkylene group; that is, where $R^1$ and $R^2$ are concatenated, it is merely necessary to reflux said material in an aqueous solution of hydroxylamine hydrochloride and to cool to precipitate the product. The crude product can be purified by conventional techniques, such as by recrystallization from a lower alkanol solvent.

The starting 1-(3-p-halobenzoylpropyl)piperidines are prepared as disclosed and claimed in co-pending application Ser. No. 250,245, filed Jan. 9, 1963. These compounds are prepared by reacting a 4-halo-p-halobutyrophenone with piperidine in the presence of an inert solvent. The starting azaspiro compounds are prepared as disclosed and claimed in co-pending application Ser. No. 136,456, filed Sept. 7, 1961, now U.S. Patent No. 3,238,217, by reacting a 3-azaspiroalkane with a 4-halo-p-substituted-butyrophenone.

The following examples serve to illustrate this invention:

Example 1

A solution of hydroxylamine hydrochloride (1.76 grams, 0.025 mole), in 50 ml. water was added to 3-(3-p-fluorobenzoylpropyl)-3 - azaspiro[5.5]undecane (6.34 grams, 0.02 mole). The mixture was refluxed for about 4 hours and then cooled to room temperature. A white solid had formed. This was filtered off and recrystallized first from ethanol-ether, then from ethanolheptane to give the product melting at 207° C.

Analysis.—Calc'd for $C_{20}H_{30}ClFN_2O$: 65.11%, C; 8.20%, H; 9.61%, Cl; 7.60% N. Found: 65.26%, C; 8.33%, H; 9.67%, Cl; 7.53% N.

Example 2

A solution of hydroxylamine hydrochloride (2.50 grams, 0.035 mole) in 10 ml. of water was added to 1-(3-p-fluorobenzoylpropyl)piperidine (8.71 grams, 0.035 mole). The mixture was refluxed for 4 hours, then cooled to room temperature and diluted with 50 ml. water. The aqueous solution was made strongly alkaline with potassium carbonate. The solid that formed was filtered off and recrystallized first from ethanol, then from ethanol-water to give 6.11 grams (66% yield) of the product melting at 150–153° C.

Analysis.—Calc'd for $C_{15}H_{21}FN_2O$: 68.15%, C; 8.00%, H; 10.60%, N. Found: 68.28%, C; 8.09%, H; 10.83%, N.

Hydrochloride: M.P. 189.5–191° C.
Analysis.—Calc'd for $C_{15}H_{22}FClN_2O$: 59.89%, C; 7.36%, H; 11.79%, Cl; 9.32%, N. Found: 60.00%, C; 7.57%, H; 11.80%, Cl; 9.24% N.

Example 3

A solution of hydroxylamine hydrochloride (2.5 grams, 0.035 mole) in 20 ml. of water was added to 1-(3-p-fluorobenzoylpropyl)-4,4 - dimethylpiperidine (9.2 grams, .033 mole). The mixture was refluxed for 4 hours, then cooled to room temperature. The solid that had formed was filtered off, dissolved in 200 ml. hot water and the solution filtered. The filtrate was made strongly alkaline with potassium carbonate. After chilling, the solid that had formed was filtered off and recrystallized from ethanol-water to give 7.9 grams (81.4% yield) of product melting at 140–143° C.

Analysis.—Calculated: 69.83%, C; 8.62%, H; 9.58%, N. Found: 69.94%, C; 8.37%, H; 9.48%, N.

Example 4

1-(3-p-fluorobenzoylpropyl)-4 - methyl-4-propylpiperidine oxime is obtained by refluxing an aqueous solution of hydroxylamine hydrochloride and 1-(3-p-fluorobenzoylpropyl)-4-methyl-4-propyl piperidine for 4–6 hours and working up in the manner of Example 1.

Example 5

3-(3-p-methoxybenzoylpropyl)-3 - azaspiro[5.5]undecane oxime is obtained by refluxing in aqueous solution hydroxylamine hydrochloride and 3-(3-p-methoxybenzoylpropyl)-3-azaspiro[5.5]undecane for 4 to 6 hours, and working up in the manner of Example 1.

Example 6

3-(3-m-toluoylpropyl)-3 - azaspiro[5.5]undecane oxime is obtained by refluxing an aqueous solution of hydroxylamine hydrochloride and 3-(3-m-toluoylpropyl)-3-azaspiro[5.5]undecane for 4 to 6 hours, and working up in the manner of Example 1.

Example 7

The oxime of 3-(3-o-chlorobenzoylpropyl)-3-azaspiro[5.5]undecane is prepared by refluxing in aqueous solution hydroxylamine hydrochloride and 3-(3-o-chlorobenzoylpropyl)-3-azaspiro[5.5]undecane for 4 to 6 hours as in Example 1.

As therapeutic agents, the compounds of this invention can be administered in oral dosage forms such as tablets, capsules or similar oral medicaments. For intravenous administration, the compounds may be made available in a liquid form by admixing with pharmaceutically acceptable alcohols or with water.

We claim:
1. A compound of the formula:

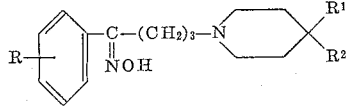

and pharmaceutically acceptable acid addition salts thereof wherein R is selected from the group consisting of halogen, lower alkoxy and lower alkyl; $R^1$ and $R^2$ are lower alkyl groups and when taken together form a ring having from 5 to 6 carbon atoms.

2. 4'-fluoro-4-(3 - azaspiro[5.5]undec-3 - yl)butyrophenone oxime.

3. 4'-fluoro-4-piperidinobutyrophenone oxime.
4. 1 - (3 - p - fluorobenzoylpropyl) - 4 - 4 - dimethylpiperidine oxime.

References Cited by the Examiner
UNITED STATES PATENTS

| | | | |
|---|---|---|---|
| 3,080,372 | 3/1963 | Janssen | 260—294.7 |
| 3,082,255 | 3/1963 | Stevens et al. | 260—294.7 |
| 3,209,006 | 9/1965 | Wragg et al. | 260—294.7 |
| 3,234,255 | 2/1966 | Hackmann | 260—293 |

OTHER REFERENCES
Fieser & Fieser, Advanced Organic Chemistry, page 432, Reinhold Pub.

WALTER A. MODANCE, *Primary Examiner.*
JOHN D. RANDOLPH, *Examiner.*
A. D. SPEVACK, *Assistant Examiner.*